United States Patent [19]

Crook et al.

[11] Patent Number: 5,357,619
[45] Date of Patent: Oct. 18, 1994

[54] PAGED MEMORY SCHEME

[75] Inventors: Neal A. Crook, Reading, England; Vincent G. Gavin, Galway, Ireland; Robert J. Galuszka, Reading, England; John M. Lenthall, Galway; Bipin Mistry, Edgware, England; Clinton Choi, London, England; Paul L. Bruce, Basingstoke, England

[73] Assignee: Digital Equipment Corporation, Maynard, Mass.

[21] Appl. No.: 819,267

[22] Filed: Jan. 10, 1992

[51] Int. Cl.5 ...................... G06F 12/06; G06F 13/00
[52] U.S. Cl. ..................................... 395/400; 395/425; 369/247.2; 369/254.3; 369/DIG. 1
[58] Field of Search .................................. 395/400, 425

[56] References Cited

U.S. PATENT DOCUMENTS

| | | | |
|---|---|---|---|
| 4,158,227 | 6/1979 | Baxter et al. | 395/425 |
| 4,495,563 | 1/1985 | McDonough | 395/800 |
| 4,768,146 | 8/1988 | Nagashima et al. | 395/400 |
| 4,831,522 | 5/1989 | Henderson et al. | 395/425 |
| 5,047,989 | 9/1991 | Canepa et al. | 395/425 |

Primary Examiner—David L. Robertson
Assistant Examiner—Michael A. Whitfield
Attorney, Agent, or Firm—Kenyon & Kenyon

[57] ABSTRACT

An apparatus and method for supplying an address and data to an external memory device. The number of pins available for supplying the address is less than the number of address lines required at the external memory device. A register is used to store the high order bits of the address and is pre-loaded with a default page value. An output of the register is coupled to an address input of the external memory. If the high order bits of the address are equal to the default page value, a control device couples the data lines directly to the external memory device and a read or write operation follows. If the two values are different, a paging cycle is performed where the high order address bits are latched through the register to the address input of the external memory and then the data bits are coupled to the external memory device. If the default page value points to the most accessed portion of the external memory device, no paging is performed during access to that portion of the external memory and processing time is saved when reads or writes of data are made to that portion of the external memory.

25 Claims, 3 Drawing Sheets

FIG. 2A
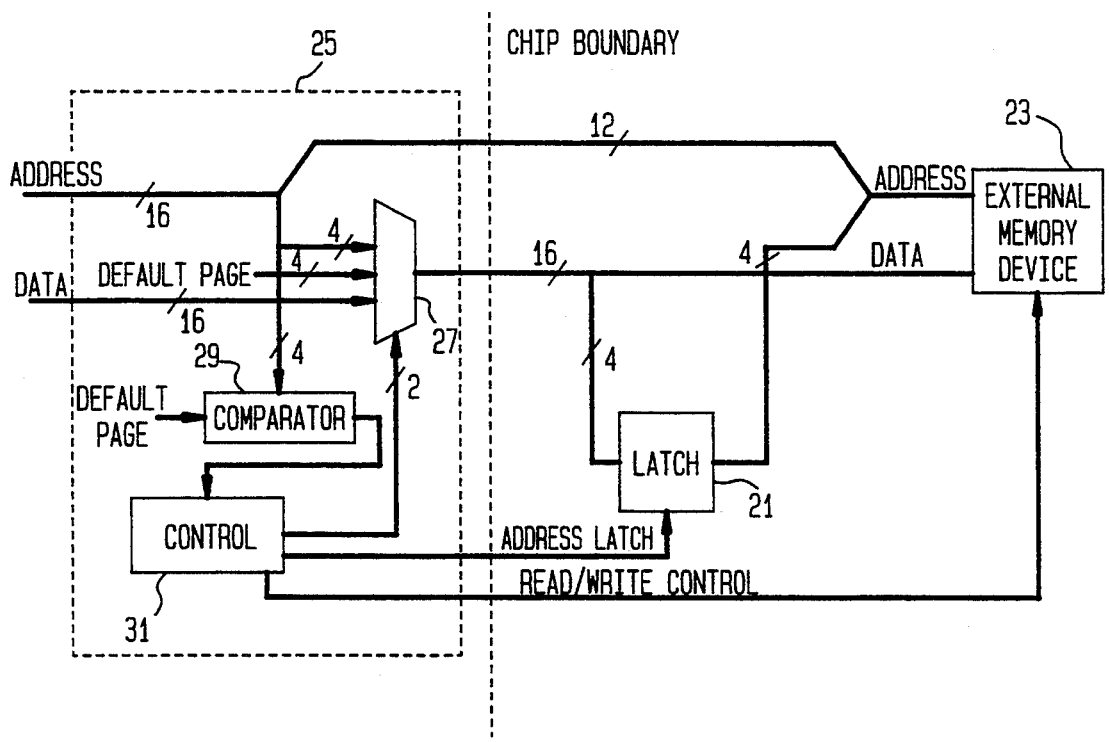
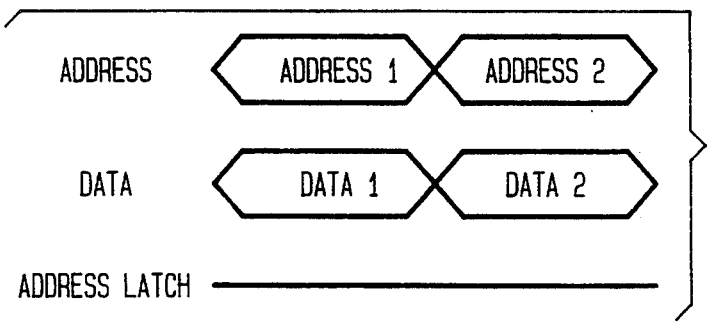
FIG. 2B
FIG. 2C
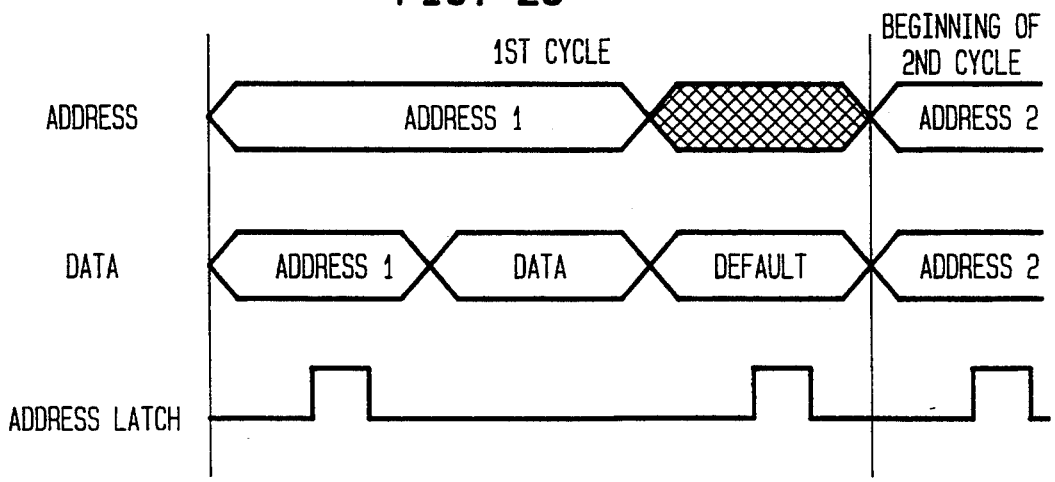

PAGED MEMORY SCHEME

FIELD OF THE INVENTION

The present invention is directed to a method and apparatus for accessing a portion of a memory space. More particularly, the present invention provides a method and apparatus for efficiently addressing a memory with a limited number of available address pins.

BACKGROUND OF THE INVENTION

In read and write operations in a computer memory, an address is used which has enough possible unique values to correspond to any one of the available addressable locations in the memory space. For instance a 64 Kbyte RAM will require an address having at least a 16-bit length to allow direct access to each memory location.

A known microprocessor, e.g. an Intel ® 8086 microprocessor, can utilize a multiplexed address and data bus so that a certain number of pins are shared by address and data transmissions. In the known system, every bus cycle comprises an address phase, where the address is strobed into a latch and a data phase, where the data is written to or read from a memory. Though efficient in using pins, this method of supplying an address on a limited number of pins is slow.

A known method for increasing the number of addressable locations that can be accessed with an address having a length that is less than the number of bits required for the memory space is referred to as paging. In a paging scheme, a first unique address value is generated to define a "page" of the memory. A second unique address value, called an offset, is then generated to specify an addressable location in the selected page. Paging becomes necessary when an application requires a larger address space than was originally anticipated or when insufficient addressing pins are available for transmitting an address off a chip.

Paging can be implemented in a variety of ways. For instance, it can be controlled by software by writing an address to an output device to select the appropriate page, then data can be read from or written to the selected page. Paging can also be implemented in hardware where a device recognizes that an address is not in the currently selected address space and changes the page accordingly.

There is, therefore, a need for an addressing scheme that allows for efficient access of memory using a limited address length or an economical number of pins for address transmission.

SUMMARY OF THE INVENTION

The present invention is directed to an apparatus and method for supplying a limited number of address bits, e.g., via a limited number of pins on a chip. Those address bits that can be placed at the pins are directly coupled to an external memory device. The remaining address bits are stored in a memory device such as a register or latch having an output coupled to the external memory device. The latch can be arranged external to the chip so that the address bits provided by the latch do not use any pins of the chip.

The address bits stored in the latch can be loaded through shared pins of the chip, as, e.g., certain ones of the pins used to transmit data on and off the chip. The address bits to be stored in the latch are coupled to an input of a multiplexing device. The data bits are coupled to the other input of the multiplexing device. The latch has its input coupled to the output of the multiplexing device.

In accordance with a feature of the present invention, the latch is arranged to store a default page value which specifies a default page within the external memory device. At initialization time (e.g. at reset), a paging cycle is executed wherein the default page value is selected and latched into the latch. On the processor chip, the high order bits of a current address are compared to the default page value. On a match, a control device selects the data bits at the multiplexing device and a read or write operation follows quickly. If there is no match, a paging cycle is executed where the high order bits of the address are selected at the multiplexing device and latched through the latch. Then, the control device selects the data bits at the multiplexing device and the read or write operation follows. Finally, a second paging cycle is performed to restore the default page value to the latch.

If the default page value corresponds to the most frequently accessed page of the memory, the processing time for the paging cycle is saved for each memory access to that page for more efficient read and write operations within the busiest portion of the memory.

BRIEF DESCRIPTION OF THE DRAWING

FIG. 2A is a block diagram of a circuit for supplying address and data information to an external memory device constructed according to an embodiment of the present invention.

FIGS. 2B and 2C are timing diagrams for the circuit of FIG. 2A.

DETAILED DESCRIPTION

Figure 1A:
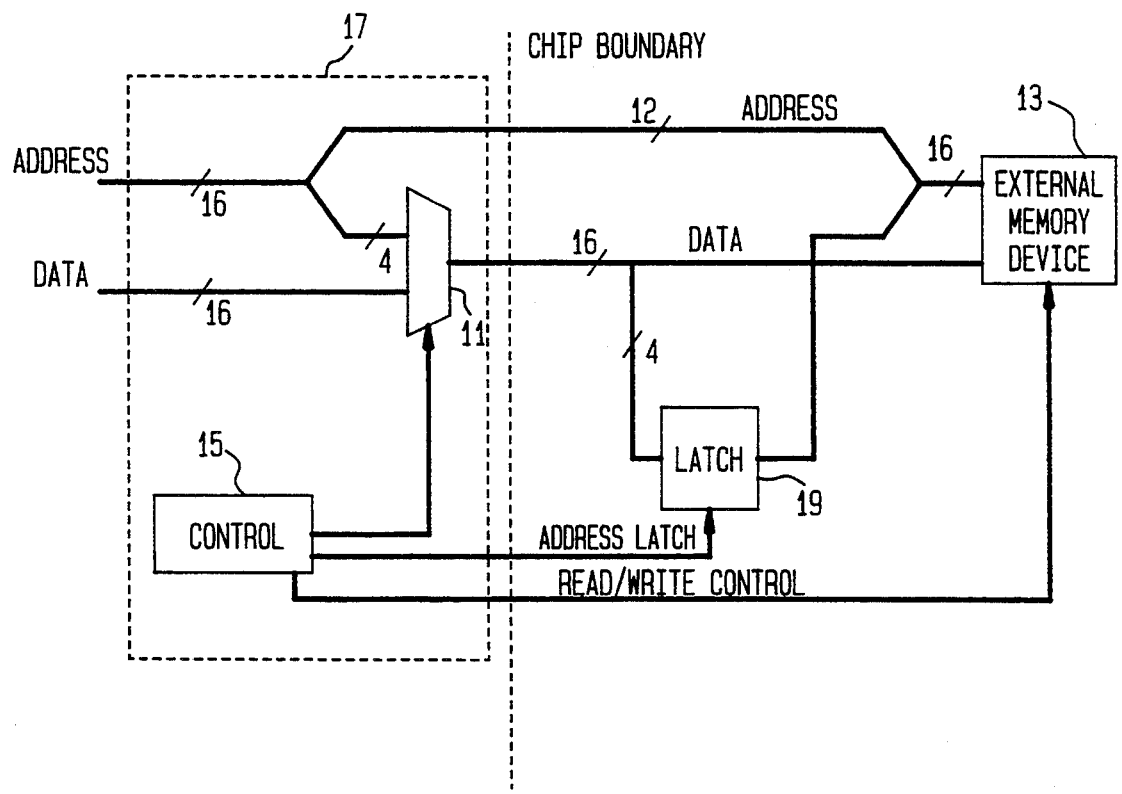
FIG. 1A is a block diagram of a known circuit performing an example of a paged memory scheme for supplying address and data information to an external memory device.

Referring to FIG. 1A, an example of a known paged memory system is shown. In this example, only thirteen pins are available to address 64 Kwords. Using twelve pins for an address allows access to 4,096 locations (i.e., $2^{12}=4,096$). The thirteenth pin could be used as a latch enable for high order bits of the address. As illustrated in FIG. 1A, an incoming address is split into a string of twelve bits and a string of four bits. The string of four bits is coupled to a multiplexing device 11. The string of twelve bits is coupled directly to an address input of an external memory device 13 via the twelve available pins. A control device 15 controls the operation of the multiplexing device 11 in an interface 17 between the incoming address and data lines and the external memory device 13. The control device 15 also provides an address latch enable signal to a register or latch 19 and a read/write control signal to the external memory device 13. In this example, the external memory device 13 is a 64 Kword memory.

In operation, the control device 15 will select the appropriate writing or reading function with a read/write control signal. The control device 15 will also select the string of four bits of the address at the multiplexing device 11. These four bits will then be latched and supplied to the address input of the external memory device 13. Then, the control device 15 will select the incoming data string at the multiplexing device 11 which allows this data string to be supplied to the data input of the external memory device 13.

Figure 1B:
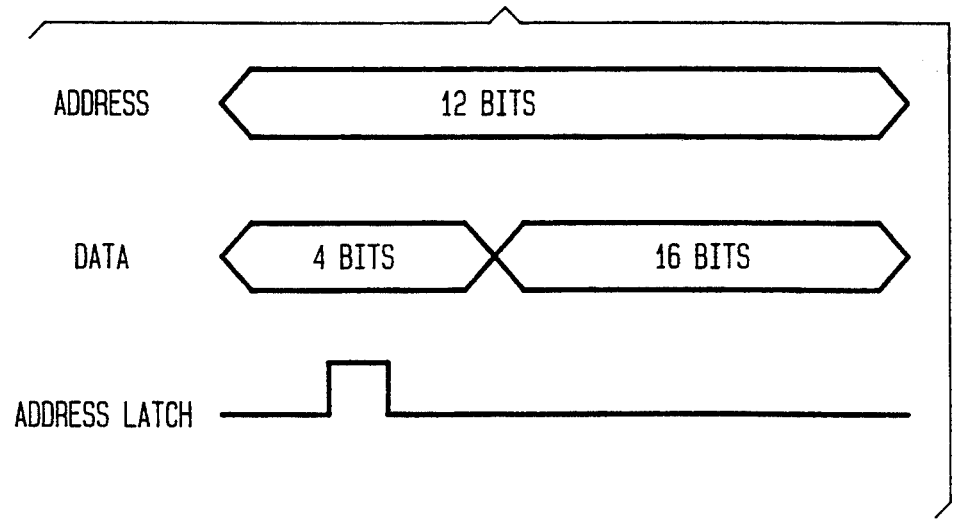
FIG. 1B is a timing diagram for the circuit of FIG. 1A.

If the twelve bit string represents the low order bits of an address, they will actually point to a 4 Kword offset in a page of memory in the external memory device 13. Therefore, there is a delay in the arrangement of FIG. 1A in that a paging cycle occurs in order to supply the appropriate page address (i.e., the four high order bits of the address) to the latch 19. The timing of the arrangement of FIG. 1A is shown in FIG. 1B.

Referring to FIG. 2A, a block diagram of a circuit performing the paged addressing scheme of the present invention is shown. A register or latch 21 is used as an external page register supplying the four high order address bits for a 4 Kword page of memory. In order to avoid the paging cycle seen in FIGS. 1A and 1B for access to a certain preselected area of memory, the four bits appearing at the output of the latch 21 are set to a default value which points to the most accessed 4 Kword page of memory in an external memory device 23. During initialization, a single paging cycle is used to load the default value in the latch 21.

An interface 25 between the incoming system address and data lines and the external memory device 23 comprises a multiplexing device 27, a comparator 29, and a control device 31. The control device 31 controls the operation of the external memory device 23 via a read/write control line. The control device 31 also controls the operation of the latch 21 with an address latch enable line and the multiplexing device 27. The comparator 29 has two inputs, one of which is coupled to the four high order bits of the incoming address. The second input of the comparator 29 is set to the default string of four bits. The comparator 29 is coupled to the control device 31 to provide an indication to the control device 31 of the comparison between the high order bits input to the comparator 29 and the default value.

When a read or write operation is to be performed, the appropriate binary values will appear on the incoming address and data lines. The twelve low order bits of the address are coupled directly to the address input of the external memory device 23 via twelve pins available for use as address pins. The four high order bits of the incoming address are coupled directly to the multiplexing device 27 and the first input of the comparator 29.

If the comparator 29 determines that the four high order bits of the address are equal to the default page setting, the control device 31 responds by enabling the requested read or write operation at the external memory device via the read/write control line. The latch 21 provides for the immediate and direct input of the high order default page value to the memory device 23. The control device 31 will also select the data lines at the multiplexing device 27. As seen in FIG. 2B, the address and data information are quickly processed for all read and write operations using the default page.

If the comparator 29 determines that the four high order bits of the incoming address are not equal to the default setting, the control device 31 responds by selecting the four high order address lines at the multiplexing device 27. The control device 31 will then send an address latch enable signal to the latch 21 in order to couple the appropriate binary values of the high order address bits input to the multiplexing device 27 to the address input of the external memory device 23.

Once the four high order bits of the address are latched, the control device 31 will select the data lines at the multiplexing device 27. The appropriate read/write operation at the external memory device 23 will then be initiated by the control device 31 via the read/write control line.

When the read/write operation is completed, the default value is resupplied to the latch 21. In the embodiment illustrated in FIG. 2A, after a read to a non-default page, the control device 31 will select a default page line at the multiplexing device 27. The control device 31 will then send an address latch enable signal to the latch 21 in order to latch the binary values of the default page bits input to the multiplexing device 27 into the latch 27. The timing diagram for such non-default read/write operations is illustrated in FIG. 2C.

Figure 3:
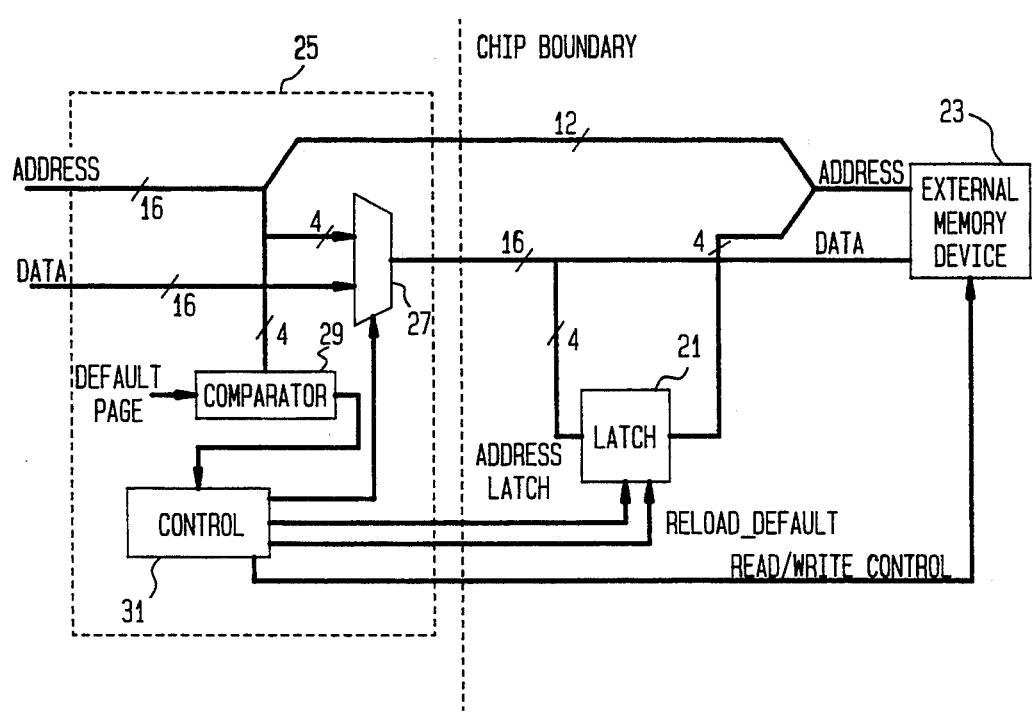
FIG. 3 is a block diagram of a circuit for supplying address and data information to an external memory device constructed according to a further embodiment of the present invention.

An alternative embodiment of the present invention is shown in FIG. 3. In the illustrated embodiment, the default page value is set to four binary zero values. After a read or write to a non-default page, the control device 31 asserts a reload_default signal which causes the latch signal output to be reset to the binary 0 values. In this manner, the default page value, binary 0, is reloaded into the latch 21 after a read/write operation to a non-default page. The use of binary zeros for the default page value simplifies the system in that the default page value can be conveniently reloaded into the latch 21 by resetting the latch 21 to zero.

It will be appreciated by one having ordinary skill in the art that many variations of the present invention can be realized. The paged memory scheme can be set up for different address lengths and the default page setting can be programmably changed. Also, the extended address space which is produced via the paged memory scheme can be encoded in a known manner to select and address multiple physical memory devices.

What is claimed is:

1. An apparatus for supplying a system address having p address bits, the system address comprising a first string of m bits and a second string of n bits, wherein p=m+n, the apparatus comprising:

a register having m inputs lines, a control input, and m output lines, the first string of m bits being supplied to the m input lines of the register by an accessing device, the register being pre-loaded with a predetermined default page value, an enable signal asserted at the control input of the register operates to coupled the m bits at the input lines to the m output lines of the register;

a comparator, having first and second inputs and an output, the first input of the comparator coupled to the first string of m bits in the system address, the second input of the comparator is coupled to receive the default page value, such that a binary value is asserted at the output in dependence on agreement between the m bits at the first input and the default page value at the second input of the comparator; and a control device having an input coupled to the output of the comparator and a first output coupled to the control input of the register, such that when the m bits and the default page value are not in agreement in the comparator, the control device is responsive to the binary value output by the comparator to send the enable signal to the control input of the register to coupled the m bits at the m input lines to the m output lines of the register.

2. The apparatus of claim 1, wherein the register comprises a latch.

3. The apparatus of claim 1, further comprising:
an external memory device having p address inputs, the second string of n bits being coupled to n of the address inputs, the m output lines of the register being coupled to m of the address inputs of the external memory device, the external memory device including a number of memory locations such that the system address asserted at the address inputs corresponds to a unique memory location, the system address used for read and write operations.

4. The apparatus of claim 3, wherein the control device reloads the default page value into the register after performing one of a read and write operation when the binary value output by the comparator indicates the m bits and the default page value are not in agreement.

5. The apparatus of claim 4, wherein the default page value comprises binary 0 values, the register further comprises a second control input coupled to the control device, and wherein the control device reloads the default page value into the register by asserting a default signal at the second control input to cause the register to reset to binary 0 values.

6. The apparatus of claim 3, wherein the external memory device includes a control input coupled to the control device, such that the control device inhibits the read and write operations until the control device has received the binary value from the comparator.

7. An apparatus for supplying a system address having a first number of address bits, and system data having a second number of data bits, the apparatus comprising:
an external memory device having a number of address inputs equal to the first number and a number of data inputs equal to the second number, n of the first number of system address bits being supplied to the address inputs by an access device, the external memory device including a number of memory locations such that a system address asserted at the address inputs corresponds to a unique memory location, the system address used for read and write operations;
a multiplexing device having at least a first, second and third series of input lines, a control input, and a number of output lines equal to the second number, m of the system address bits being supplied to the first series of inputs by the access device such that m+n equals the first number, the second number of data bits being supplied to the second series of inputs, and a default page value being supplied to the third series of inputs,
the output lines of the multiplexing device being coupled to the data inputs of the external memory device, a controlling binary value on the control input of the multiplexing device operates to selectively couple one of the first, second and third series of input lines to the output lines;
a register having an m bit input, a first control input, and an m bit output, m bits of the output of the multiplexing device, corresponding to the m bits of the system address, being supplied to the m bit input of the register, the m bit output of the register being coupled to the address inputs of the external memory device, the m bit output of the register being pre-loaded with the default page value, binary data asserted at the output of the register specifies a portion of memory locations in the external memory device, an address latch signal asserted at the control input of the register operates to couple the m bits of the system address at the m bit input to the m bit output;
a comparator, having first and second inputs and output, the first input of the comparator receiving the m bits of the system address from the access device, the default page value asserted at the second input of the comparator, such that a binary value appears at the output in dependence on agreement between binary values asserted at the first and second inputs; and
a control device having an input coupled to the output of the comparator, a first output coupled to and supplying the controlling binary value to the control input of the multiplexing device, a second output coupled to and supplying the address latch signal to the control input of the register, such that when binary values at the first and second series of inputs are in agreement in the comparator , the control device is responsive to the binary value output by the comparator to select the data bits at the multiplexing device and when binary values asserted at the first and second inputs of the comparator are not in agreement, the control device is responsive to the binary value output by the comparator to select the m address bits at the multiplexing device, to send an address latch signal to the first control input of the register, and thereafter to select the data bits for output from the multiplexing device.

8. The apparatus of claim 7, wherein the control device reloads the default page value into the register after selecting the data bits at the multiplexing device when the binary value output by the comparator indicates that the m bits and default page value are not in agreement.

9. The apparatus of claim 8, wherein the control device reloads the register by selecting the default page value at the multiplexing device, and sending the address latch signal to the control input of the register.

10. The apparatus of claim 7 wherein the register comprises a latch.

11. An apparatus for supplying a system address having a first number of system address bits, and system data having a second number of data bits, the apparatus comprising:
an external memory device having a number of address input equal to the first number and a number of data inputs equal to the second number, n of the first number of system address bits being supplied to the address inputs by an access device, the external memory device including a number of memory locations such that a system address asserted at the address inputs corresponds to a unique memory location, the system address used for read and write operations;
a multiplexing device having at least a first and second series of input lines, a control input, and a number of output lines equal to the second number, m of the system address bits being coupled to the first series of inputs such that m+n equals the first number, the second number of data bits being coupled to the second series of inputs, the output lines of the multiplexing device being coupled to the data inputs of the external memory device, a controlling binary value on the control input of the multiplexing device operates to selectively couple one of the first and second series of input lines to the output lines;

a register having an m bit input, a first control input, and a m bit output, m bits of the output of the multiplexing device, corresponding to the m bits of the system address, being coupled to the m bit input of the register, the m bit output of the register being coupled to the address inputs of the external memory device, the register being pre-loaded with a predetermined default page value, binary data asserted at the output of the register specifies a portion of memory locations in the external memory device, an address latch signal asserted at the control input of the register operates to couple the m bits of the system address at the m bit input to the m bit output of the register;

a comparator, having first and second inputs and an output, the first input of the comparator coupled to the m bits of the system address supplied by the accessing device, the default page value asserted at the second input of the comparator, such that a binary value is asserted at the output in dependence on agreement between binary values asserted at the first and second inputs; and a control device having an input coupled to the output of the comparator, a first output coupled to and supplying the controlling binary value to the control input of the multiplexing device, a second output coupled to and supplying the address latch signal to the control input of the register, such that when binary values at the first and second series of inputs are in agreement in the comparator, the control device is responsive to the binary value output by the comparator to select the data bits at the multiplexing device.

12. The apparatus of claim 11, wherein if binary values asserted at the first and second inputs of the comparator are not in agreement, the control device is responsive to the binary value output by the comparator to select the m address bits at the multiplexing device, to send an address latch signal to the first control input of the register to couple the m bits at the m bit input to the m bit output of the register, and thereafter to select the data bits for output from the multiplexing device.

13. The apparatus of claim 12, wherein the control device reloads the default page value into the register after selecting the data bits at the multiplexing device when the binary value output by the comparator indicates that the m bits and the default page value are not in agreement.

14. The apparatus of claim 13, wherein the default page value comprises binary 0 values, the register further comprises a second control input coupled to the control device, and wherein the control device reloads the default page value into the register by asserting a default signal at the second control input to cause the register to reset to binary 0 values.

15. The apparatus of claim 11, wherein the register comprises a latch.

16. The apparatus of claim 11, wherein the external memory device includes a control input coupled to the control device, such that the control device inhibits the read and write operations until the control device selects the data bits at the multiplexing device.

17. A method of supplying a system address having a first number of address bits, and system data having a second number of data bits to address and data inputs of an external memory device, the external memory device performing read and write operations, the method comprising the steps of:

supplying n bits of the first number of system address bits to address input lines of the external memory device;

coupling m bits of the first number of system address bits to a first input of a multiplexing device, such that m+n equals the first number;

coupling the second number of data bits to a second input of the multiplexing device, such that the multiplexing device selectively couples one of the first and second inputs to an output of the multiplexing device;

coupling output lines of the multiplexing device to data inputs of the external memory device;

generating at m output lines of a register a default page value for the m bits of the first number of system address bits, the default page value specifies a portion of memory locations in the external memory;

coupling the m output lines of the register to corresponding address input lines of the external memory;

comparing the m bits of the first number of address bits with the default page value;

coupling a number of output lines of the multiplexing device corresponding to the m bits of the system address bits, to an m bit input of the register; and selecting the second number of data bits at the multiplexing device such that the data bits are supplied to the data input of the external memory device when the m bits of the system address bits equal the default page value.

18. The method of claim 17, wherein in the selecting step when the m bits of the system address bits do not equal the default page value, the m bits of the system address bits are selected at the multiplexing device such that the m bits are supplied to the register, the method further comprising:

sending an address latch enable signal from a control device to a first control input of the register such that the m bits supplied to the input of the register are latched to the output lines of the register; and thereafter selecting the data bits at the multiplexing device such that the data bits are supplied to the data inputs of the external memory device.

19. The method of claim 18, further comprising:
resetting the output of the register to the default page value after selecting the data bits at the multiplexing device.

20. The method of claim 18, further comprising:
inhibiting write and read operations at the external memory device until the data bits are selected at the multiplexing device.

21. The method of claim 17, wherein the default page value comprises binary 0 values.

22. The method of claim 21, wherein in the selecting step when the m bits of the system address bits does not equal the default page value, the m bits of the system address bits are selected at the multiplexing device such that the m bits are supplied to the register, the method further comprising:

sending an address latch enable signal to a first control input of the register such that the m bits supplied to the input of the register are latched to the output lines of the register; and thereafter selecting the data bits at the multiplexing device such that the data bits are supplied to the data inputs of the external memory device.

23. The method of claim 22, further comprising:
resetting the output of the register to the default page value after selecting the data bits at the multiplexing device.

24. The method of claim 23 wherein the step of resetting is performed by resetting the output of the register to binary 0 values.

25. The method of claim 22, further comprising:
inhibiting write and read operations at the external memory device until the data bits are selected at the multiplexing device.

* * * * *